(12) United States Patent
Cantu' et al.

(10) Patent No.: US 8,172,973 B2
(45) Date of Patent: May 8, 2012

(54) METHOD AND APPARATUS FOR MOLDING AND CURING A TYRE FOR A VEHICLE WHEEL

(75) Inventors: Marco Cantu', Carnate (IT); Andrea Casali, Bresso (IT); Pierangelo Misani, Monza (IT); Pier Giuseppe Piantanida, Oleggio (IT); Riccardo Azzaretto, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 703 days.

(21) Appl. No.: 10/532,711

(22) PCT Filed: Nov. 12, 2003

(86) PCT No.: PCT/EP03/12631
§ 371 (c)(1),
(2), (4) Date: Oct. 14, 2005

(87) PCT Pub. No.: WO2004/045837
PCT Pub. Date: Jun. 3, 2004

(65) Prior Publication Data
US 2006/0119006 A1 Jun. 8, 2006

(30) Foreign Application Priority Data
Nov. 20, 2002 (WO) .................. PCT/IB02/04833

(51) Int. Cl.
*B29D 30/10* (2006.01)
*B29C 33/04* (2006.01)
*B29C 35/04* (2006.01)

(52) U.S. Cl. ......... 156/130.5; 264/501; 425/41; 425/44; 425/50

(58) Field of Classification Search ............... 156/130.5, 156/117, 123; 425/36, 40, 41, 44, 49, 50; 264/501, 502, 326
See application file for complete search history.

(56) References Cited

U.S. PATENT DOCUMENTS
1,394,928 A * 10/1921 Midgley et al. ............ 156/130.5
(Continued)

FOREIGN PATENT DOCUMENTS
DE          355 909 C    7/1922
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A method of molding and curing a tire for a vehicle wheel includes building an unvulcanized tire on a toroidal support; heating the support; pressing an inner surface of the tire against an outer surface of the support; and pressing an outer surface of the tire against walls of a molding cavity defined in a vulcanization mold. The inner surface of the tire is pressed against the outer surface by at least one secondary working fluid. The outer surface of the tire is pressed against the walls by at least one primary working fluid. The at least one primary working fluid is heated, causing vulcanization of the tire. An apparatus for molding and curing a tire for a vehicle wheel includes the vulcanization mold, at least one passage device, a feeding device, and first and second heating devices. It may also include an airtight device arranged to receive the support.

18 Claims, 5 Drawing Sheets

U.S. PATENT DOCUMENTS

| | | | |
|---|---|---|---|
| 1,407,839 A * | 2/1922 | Clinefelter et al. | 156/133 |
| 1,417,551 A * | 5/1922 | Midgley | 425/42 |
| 1,798,210 A | 3/1931 | Laursen | |
| 2,169,146 A * | 8/1939 | Iverson | 425/30 |
| 4,957,676 A * | 9/1990 | Greenwood | 264/102 |
| 6,332,999 B1 * | 12/2001 | Caretta | 264/501 |
| 6,350,402 B1 * | 2/2002 | Kobayashi | 264/326 |
| 6,409,959 B1 * | 6/2002 | Caretta et al. | 264/501 |

FOREIGN PATENT DOCUMENTS

| | | |
|---|---|---|
| EP | 0 822 047 A1 | 2/1998 |
| EP | 0 928 680 A1 | 7/1999 |
| EP | 0 976 533 A2 | 2/2000 |
| EP | 1 038 657 A1 | 9/2000 |
| WO | WO 01/00395 | 1/2001 |
| WO | WO 02/45942 | 6/2002 |

* cited by examiner

METHOD AND APPARATUS FOR MOLDING AND CURING A TYRE FOR A VEHICLE WHEEL

CROSS-REFERENCE TO RELATED APPLICATIONS

This application is a national-phase entry under 35 U.S.C. §371 from International Application No. PCT/EP2003/012631, filed Nov. 12, 2003, in the European Patent Office, the content of which is relied upon and incorporated herein by reference. Additionally, Applicants claim the right of priority under 35 U.S.C. §119(a)-(d) based on International Application No. PCT/1302/04833, filed Nov. 20, 2002, in the International Bureau of the World Intellectual Property Organization.

BACKGROUND OF THE INVENTION

1. Field of the Invention

The present invention relates to a method and an apparatus for molding and curing a tyre for vehicle wheels.

2. Description of the Related Art

In a tyre production cycle it is provided that following a building process in which the different tyre components are made and/or assembled, a molding and curing process is carried out which aims at defining the tyre structure in accordance with a desired geometry, usually exhibiting a particular tread pattern.

For the purpose, the tyre is closed in a molding cavity defined internally of a vulcanisation mold and shaped in accordance with the geometric configuration of the outer surfaces of the tyre to be obtained.

A tyre generally comprises a toroidally ring-shaped carcass including one or more carcass plies, strengthened with reinforcing cords lying in radial planes, i.e. containing the rotation axis of the tyre. Each carcass ply has its ends integrally associated with at least one annular reinforcing metal structure, usually known as bead core, constituting the reinforcing piece at the beads, i.e. at the radially internal ends of said tyre, the function of which is to enable assembling of the tyre with a corresponding mounting rim. Placed crownwise to said carcass is a band of elastomer material, called tread band, in which at the end of the curing and vulcanisation steps a raised pattern is formed for ground contact. A reinforcing structure usually known as belt structure is placed between the carcass and tread band. This structure in the case of tyres for cars usually comprises at least two radially superposed strips of rubberised fabric provided with reinforcing cords, usually of metal material, disposed parallel to each other in each strip and in crossed relationship with the cords of the adjacent strip, preferably symmetrically disposed with respect to the equatorial plane of the tyre.

Preferably, said belt structure further comprises, at a radially external position thereof, at least on the ends of the underlying strips, a third layer of textile or metallic cords as well, that are disposed circumferentially (at 0 degrees).

Finally, in tyres of the tubeless type i.e. devoid of an air tube, a radially internal layer generally called liner is present which has imperviousness features to ensure the tyre airtightness.

To the aims of the present invention it is to be pointed out that by the term "elastomer material" it is intended a composition comprising at least one elastomer polymer and at least one reinforcing filler. Preferably, this composition further comprises additives, such as cross-linking and/or plasticizing agents, for example. By virtue of the presence of the cross-linking agents, this material can be cross-linked through heating, so as to form the final manufactured article.

There are molding and curing methods in which a green tyre put on a rigid toroidal support is arranged within the mold. Said methods are preferably employed for tyres that, following recent building processes, are produced starting from a limited number of elementary semifinished products fed onto a toroidal support the outer profile of which is coincident with that of the radially internal surface of the tyre that is wished to be produced. Said toroidal support is moved, preferably by a robotized system, between a plurality of stations in each of which, through automated sequences, a particular building step of the tyre is carried out (see document EP 0 928 680 in the name of the same Applicant, for example).

The European Patent Application published under No. 0 976 533 in the name of the same Applicant discloses a method and an apparatus for molding and curing tyres for vehicle wheels in which the green tyre built on a toroidal support is closed in a vulcanisation mold; subsequently steam or other fluid under pressure is fed into at least one gap for fluid diffusion created between the outer surface of the toroidal support and inner surface of the tyre.

SUMMARY OF THE INVENTION

The Applicant could verify that by a method of the above illustrated type, at the end of the molding and curing step, the obtained tyre may sometimes exhibit some faults. This mainly takes place because the working fluid (i.e. the vulcanisation fluid) comes directly into contact with the innermost layer of the tyre, since for tyres directly assembled and cured on the same toroidal support there is not the effect of the vulcanisation bladder. Said bladder when it is present within the green tyre in the vulcanisation mold, allows a uniform distribution of the elastomer material against the mold also correcting small working faults due to junctions, slight manual errors or errors of the building drum, for example. In fact, it should be remembered that in traditional building processes, i.e. when semifinished products even of great sizes (such as carcass plies, belt strips, tread band, for example) are assembled on cylindrical building drums and the green tyre is shaped into a toroidal conformation by appropriate devices (mechanical or pneumatic devices, for example) associated with the drums themselves, at the end of the working operation green tyres are obtained that are disengaged from their building and shaping drum/s and can therefore internally house said vulcanisation bladder.

In particular, the Applicant could ascertain during molding and curing of the tyres directly built on a toroidal support that, while the working fluid under pressure is fed between the outer surface of the toroidal support and the inner surface of the green tyre, the various components of elastomer material still in an uncured state, i.e. in a plastic state, can take an anomalous arrangement with respect to the design specifications. In particular, the carcass ply or plies can move away from their position in the bead region and slip off due to the expansion to which the tyre is submitted by said working fluid. In this way tensioning of the carcass ply or plies determined by the molding step is lower than it is provided to be for the finished tyre.

In the same manner as the carcass ply, other components of the green tyre can slide relative to each other due to the inner vulcanisation pressure during the first minutes of this processi i.e. when the plastic features of the elastomer material are more present. This phenomenon is more felt in the bead region, where in addition to partial slipping off of the carcass plies, phenomena of lack or accumulation of material are observed that give rise to formation of steps and discontinuities on the bead itself.

The Applicant has perceived that by at least partly fixing the geometry of the beads and the innermost surface of the tyre, i.e. that tyre portion in contact with the toroidal support that is the first to come into contact with the working fluid during vulcanisation, the above mentioned drawbacks can be overcome.

In more detail the Applicant has found that by pressing the green tyre from the outside to the inside and simultaneously supplying heat to the inner surface of said tyre, at least partial vulcanisation of the innermost layer of the tyre and of the bead region is obtained, so that a molding and curing step can be subsequently performed without involving lack of homogeneity and irregularities in the finished tyre.

In fact the working fluid under molding and curing conditions is in direct contact with parts of the tyre that have already been partly vulcanised and therefore no longer exhibit a plastic behaviour of the material but an almost elastic one. In this case it is obtained a uniform distribution against the mold of the elastomer material belonging to the outermost tyre layers. In addition tension of the carcass ply or plies due to the vulcanisation pressure does not cause any slipping off of the plies at the beads, since the ply or plies have become substantially integral with the elastomer materials present in this region following partial vulcanisation of same.

In a first aspect, the invention relates to a method of molding and curing a tyre for vehicle wheels comprising the steps of: building a green tyre on a toroidal support having an outer surface the shape of which substantially matches that of an inner surface of said green tyre; heating said toroidal support to transmit heat to the inner surface of the tyre in contact with said toroidal support; pressing said inner surface of said green tyre against said outer surface of said toroidal support through at least one secondary working fluid under pressure; pressing an outer surface of said green tyre against the walls of a molding cavity defined in a vulcanisation mold, through a primary working fluid under pressure passing in at least one diffusion gap between said outer surface of said toroidal support and said inner surface of said green tyre; said primary working fluid under pressure being heated so as to supply heat to said green tyre to cause vulcanisation thereof.

In a second aspect the invention relates to an apparatus for molding and curing a tyre for vehicle wheels, said apparatus comprising: an airtight vulcanisation mold arranged to receive a toroidal support adapted to support a green tyre within a molding cavity; at least one passage device adapted to feed at least one primary working fluid under pressure, which is formed through said toroidal support and opens onto the outer surface of same, so as to enable passage of said primary working fluid under pressure towards the inner surface of said green tyre; a feeding device to supply a secondary working fluid under pressure which is operatively associated with said vulcanisation mold to press said green tyre from the outside to the inside onto said outer surface of said toroidal support; heating devices to heat said toroidal support; heating devices to heat said primary working fluid to transmit heat to said green tyre and cause vulcanisation of same.

In a third aspect, the invention relates to an apparatus for molding and curing a tyre for vehicle wheels, said apparatus comprising: a vulcanisation mold arranged to receive a toroidal support adapted to support a green tyre within a molding cavity; at least one passage device, adapted to feed at least one primary working fluid under pressure, which is formed through said toroidal support and opens onto the outer surface of same, so as to enable passage of said primary working fluid under pressure to the inner surface of said green tyre; heating devices to heat said primary working fluid to transmit heat to said green tyre and cause vulcanisation of same; an airtight container arranged to receive said toroidal support; a feeding device to supply a secondary working fluid under pressure which is operatively associated with said airtight container for pressing said green tyre from the outside to the inside onto said outer surface of said toroidal support; heating devices to heat said toroidal support.

BRIEF DESCRIPTION OF THE DRAWINGS

Further features and advantages of the invention will become more apparent from the detailed description of some preferred, but not exclusive, embodiments of a method and an apparatus for molding and curing a tyre for vehicle wheels in accordance with the present invention.

This description will be set out hereinafter with reference to the accompanying drawings, given by way of non-limiting example, in which.

DETAILED DESCRIPTION OF THE EXEMPLARY EMBODIMENTS

Figure 1:
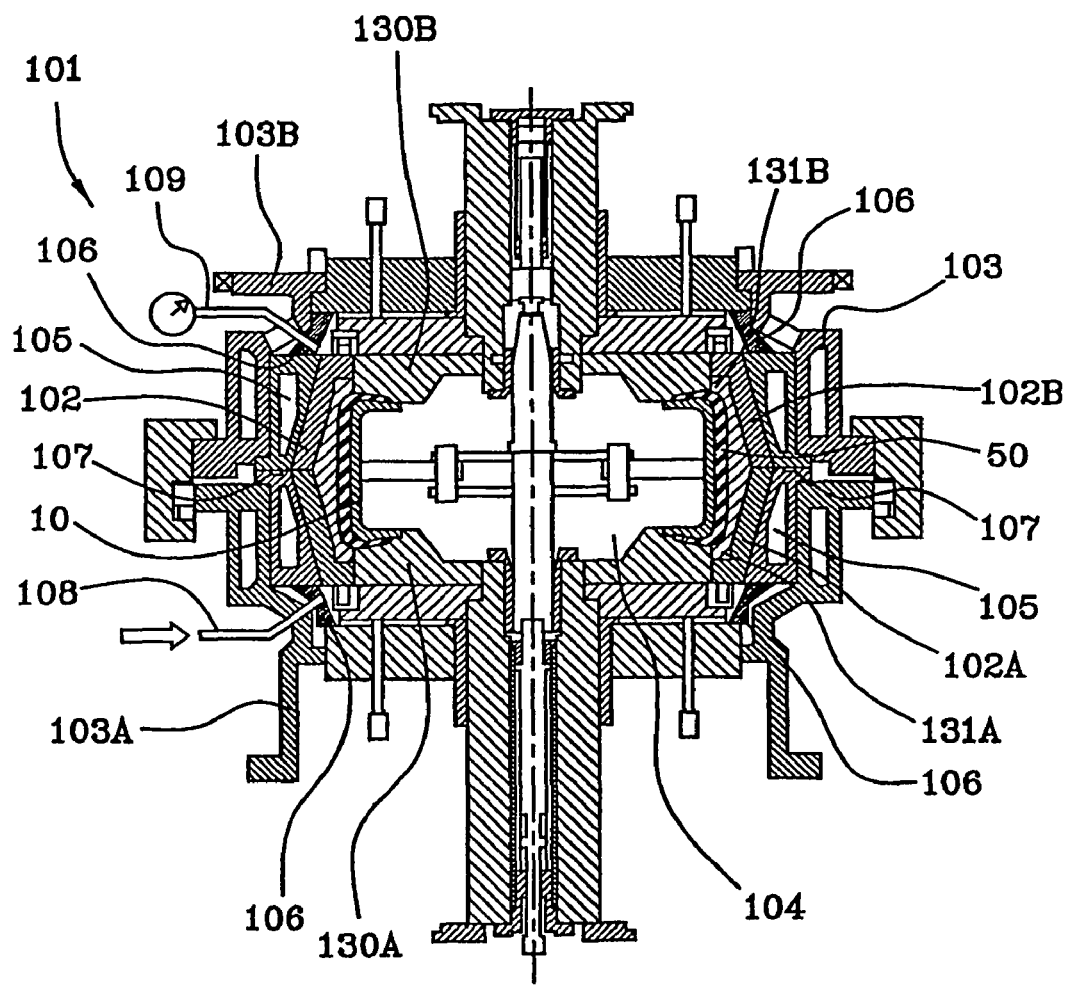
FIG. 1 is a vertical view partly in section of a preferred embodiment of the apparatus in accordance with the invention during a step of the method in question.

With reference to FIG. 1, a molding and curing apparatus for vehicle wheel tyres in accordance with a first embodiment of the present invention has been generally identified by reference numeral 101.

Apparatus 101 comprises a vulcanisation mold 102 operatively associated with an airtight container 103.

Preferably, the mold 102 can be made up of a lower half 102A and an upper half 102B, in engagement with a base 103A and a closing portion 103B of container 103, respectively.

In the embodiment shown by way of example, each of the lower 102A and upper 102B halves of mold 102 has a cheek, a lower cheek 130A and an upper cheek 130B respectively, and a crown of sectors consisting of a lower sector 131A and an upper sector 131B, respectively.

Figure 2:
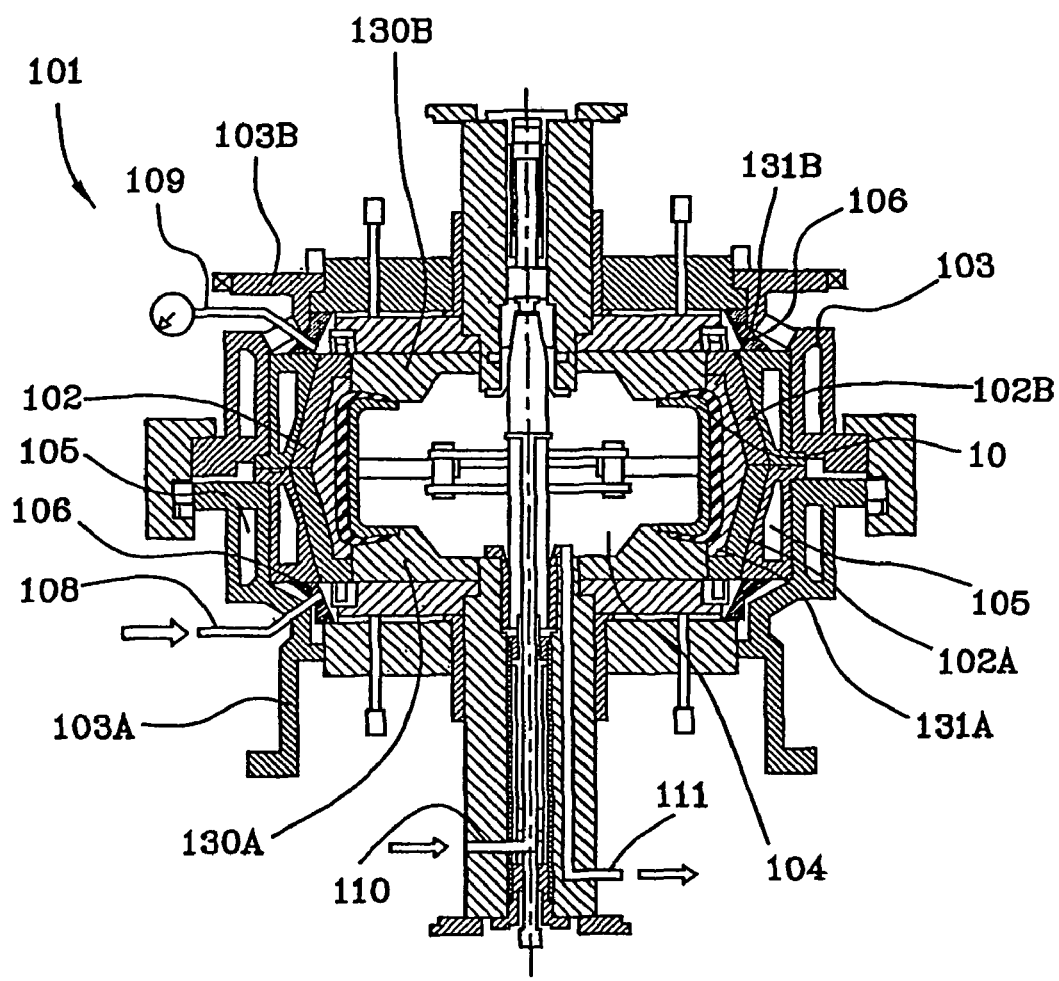
FIG. 2 is a vertical view partly in section of a preferred embodiment of the apparatus in accordance with the invention during a further step of the method in question.

The lower 102A and upper 102B halves are mutually movable between an open position at which they are spaced apart from each other, and a closed position shown in FIGS. 1 and 2, at which they are close to each other to form a molding cavity 104 the inner walls of which defined by said cheeks and said sectors reproduce the geometric configuration of the outer surface of a tyre to be obtained at the end of the molding and vulcanisation steps.

In more detail, the cheeks are designed to form the outer surfaces of the opposite tyre sidewalls, whereas the sectors are designed to form the so-called tread band of the tyre itself, by creating therein a series of cuts and longitudinal and/or transverse grooves suitably disposed in accordance with a desired "tread pattern".

Apparatus 101 further contemplates use of at least one toroidal support 10 of metal or other rigid material, having an outer surface substantially reproducing the shape of the inner surface of the tyre. The toroidal support 10 is conveniently made up of a drum that can be dismantled, i.e. made up of circumferential segments at least some of which are centripetally movable to take the toroidal support to pieces and enable easy removal of same from the tyre when working is over.

Apparatus 101 further comprises at least one duct 110 (FIG. 2) for a primary working fluid under pressure such as steam, nitrogen or other substantially inert gas or a mixture thereof, which fluid is used as better illustrated in the following, for molding and vulcanisation of the tyre.

Also preferably present in apparatus 101 are heating devices for the mold 102 preferably in the form of a plurality of ducts 105 for passage of a heating fluid.

Preferably, apparatus 101 also comprises an airtight device adapted to contain the toroidal support 10 on which a green tyre 50 has been previously built.

As shown in FIGS. 1 and 2, said airtight device in a preferred embodiment can be enclosed and integrated into said mold 102, defining an airtight cavity within the same. Preferably in this case said mold 102 comprises a plurality of seals 106 disposed close to vents for escape of the primary working fluid employed for vulcanisation of said tyre, and at least one circumferential seal 107 placed on the opposite surfaces of the two halves 102A and 102B.

Said circumferential seal 107 may consist of an O-ring or preferably a series of superposed metal rings provided between their opposite surfaces, with a sealing element capable of withstanding the pressures and temperatures of the method described in the following.

A feeding device for a secondary working fluid is operatively associated, in this embodiment, with said mold 102. Said device comprises at least one delivery duct 108 and one discharge duct 109 to respectively feed and evacuate said secondary working fluid under pressure, such as air, nitrogen or other substantially inert gases within said mold 102, to press the inner surface of said green tyre 50 from the outside to the inside, as better described in the following, against the outer surface of said toroidal support 10.

Figure 3:
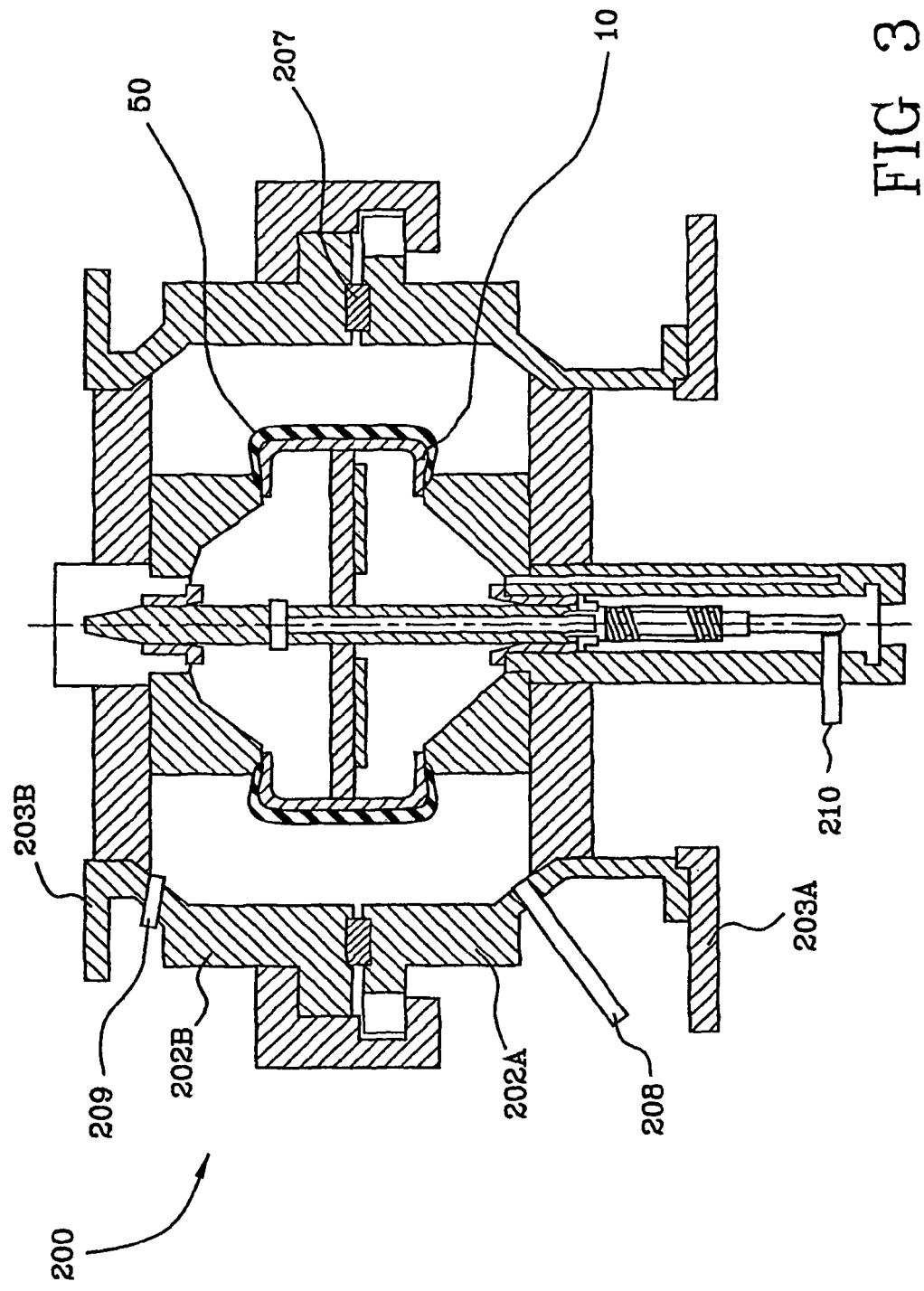
FIG. 3 is a vertical view partly in section of a device belonging to an embodiment of the apparatus in accordance with the invention.

Alternatively, an airtight device 200 may be provided (FIG. 3) externally of the mold itself. Said device will substantially be of the same outer shape as mold 102 shown in FIGS. 1 and 2, but obviously neither cheeks 130A and 130B nor sectors 131A and 131B illustrated above, i.e. those parts intended for tyre molding, will be present therein. More specifically, said device 200 comprises one lower half 202A and one upper half 202B, in engagement with a base 203A and a closing portion 203B respectively and at least one circumferential seal 207 put on the opposite surfaces of the two halves 202A and 202B. Also provided in said device 200 and in association therewith is a feeding device for a secondary working fluid comprising at least one delivery duct 208 and one discharge duct 209 to respectively feed and evacuate said secondary working fluid under pressure such as air, nitrogen and other substantially inert gases within said device 200, to press the inner surface of said green tyre 50 from the outside to the inside, as better described in the following, against the outer surface of said toroidal support 10.

Figure 3B:
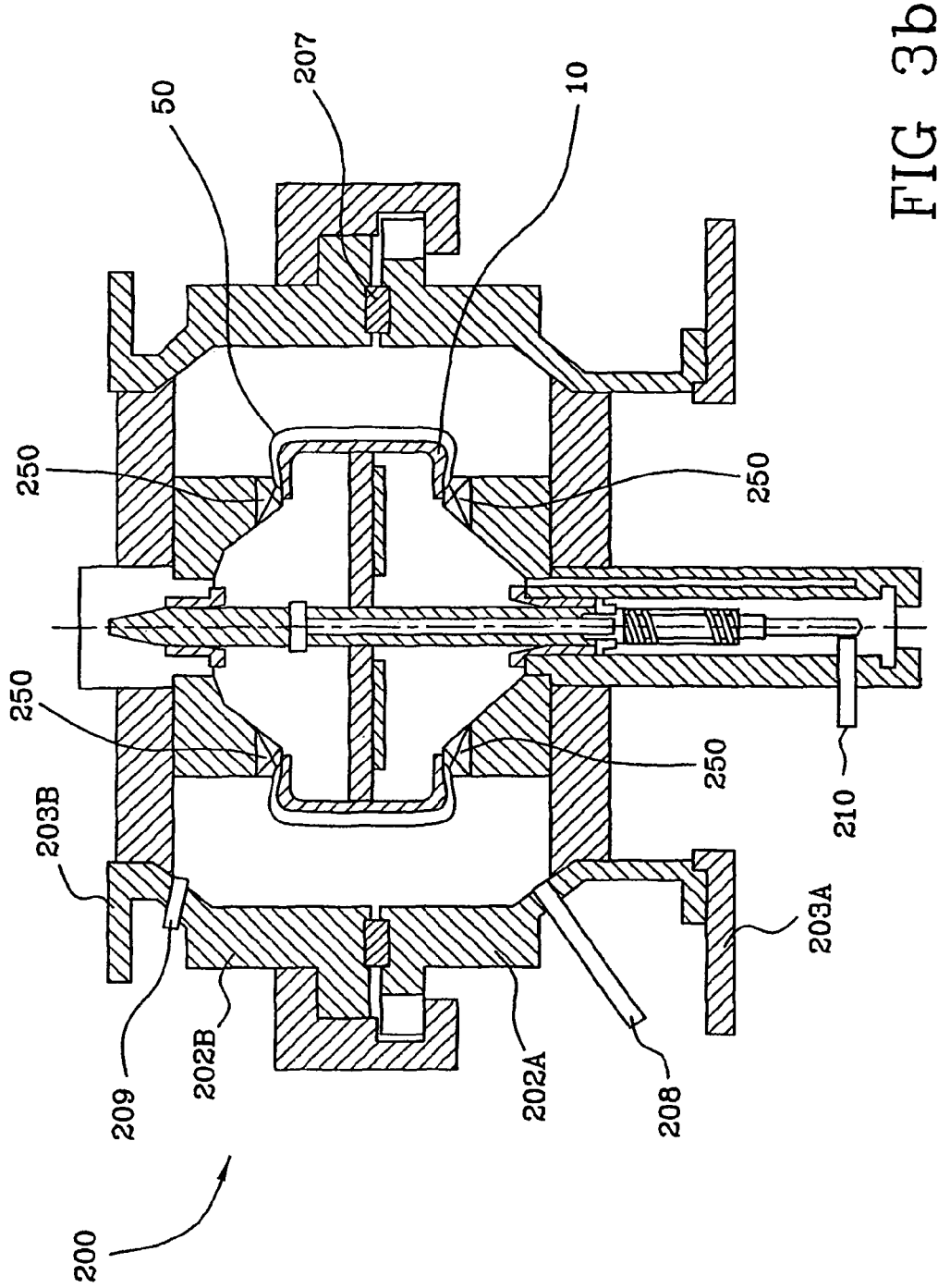
FIG. 3B is a vertical view partly in section of a device belonging to another embodiment of the apparatus in accordance with the invention.

Preferably, as shown in FIG. 3B, said device 200 may comprise at least a heating device 250 (four in FIG. 3B) disposed substantially in the positions occupied by the cheeks 130A and 130B in said mold 102. Advantageously, said heating devices 250, as it will be better understood in the following, transmit heat to the external surface of the bead regions of the green tyre 50, helping in said partial vulcanisation of said regions.

Optionally, said device 200 may provide at least one duct 210 for said primary working fluid under pressure, which fluid is employed, as better described later on, to heat the outer surface of said toroidal support 10.

Said devices 250, may be equipped with electric resistors (not shown in the figures), or alternatively may be connected to said duct 210.

In addition, when said device 200 is present, an airtight mold as above described in connection with FIGS. 1 and 2 is not required in apparatus 101.

Duct 110 (or 210) is operatively associated with at least one passage device, through a connecting duct (not shown) for example, formed along at least one of the centering shanks of said toroidal support 10, to enable diffusion of said primary working fluid under pressure within said toroidal support 10.

Said passage device comprises suitable branches formed in the toroidal support 10, through which said primary working fluid reaches a plurality of ducts opening onto the outer surface of the toroidal support itself, conveniently distributed and sizes on the circumferential extension thereof. Distribution and sizes will be of such a nature that introduction of raw elastomer material into said toroidal support 10 is prevented.

Preferably, a duct 111 adapted to discharge possible condensate is then provided at the lower part of said molding cavity 104.

In accordance with the method of the invention, the green tyre 50 is disposed on the toroidal support 10 before the latter is inserted, together with the tyre, into the airtight vulcanisation mold 102 arranged in an open condition or into said airtight device 200 if it is de-coupled from said mold.

In particular, engagement of the tyre on the toroidal support 10 can be conveniently obtained by building the tyre directly on the support itself. In this way the toroidal support 10 is advantageously utilised as a rigid core for deposition of the different components such as liner, carcass plies, reinforcing structures at the beads, belt strips, sidewalls and tread band that concur in tyre formation. More specifically, said tyre components are preferably obtained by deposition on said toroidal support 10 of semifinished products such as, by way of example, strips of elastomer material, strip-like elements of elastomer material internally comprising a plurality of textile or metallic cords, metal cords preferably made of high tensile steel. Further features on the procedure of laying down the tyre components onto the toroidal support 10 are described in the European Patent Application published under No. 0 929 680 in the name of the same Applicant, for example.

Operation of apparatus 101, once said toroidal support 10 carrying the green tyre 50 has been placed into said mold 102 (or said airtight device 200), involves closure of the apparatus itself and starting of the molding and curing operations.

Figure 4:
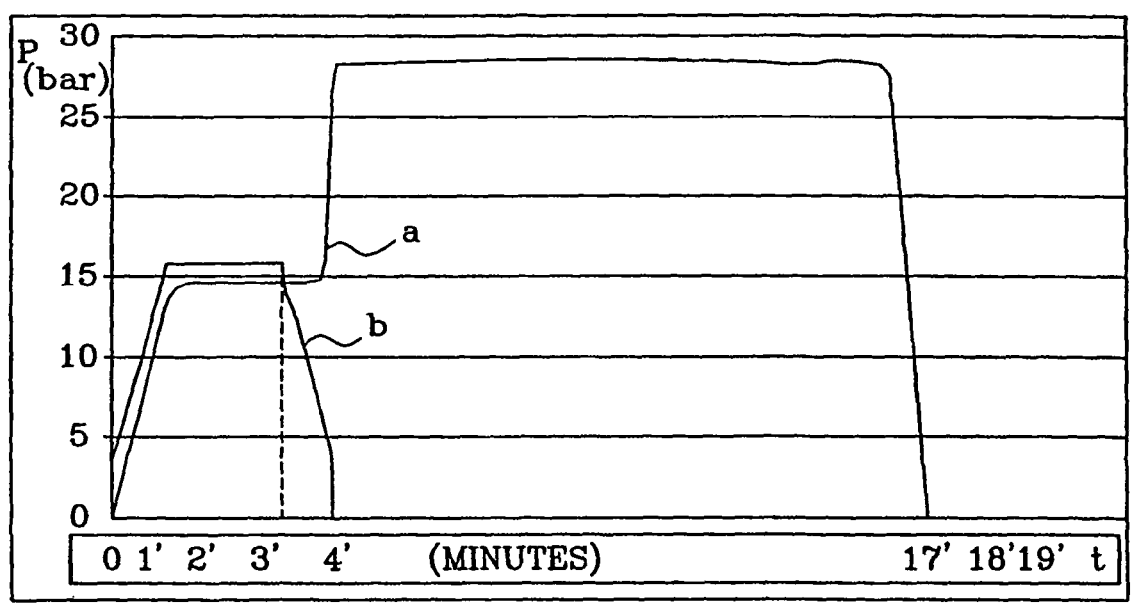
FIG. 4 is a diagram showing the course of pressure over time in relation to the working fluids employed for carrying out the concerned method.

More specifically, by duct 108 (or 208) said secondary fluid under pressure (identified with "b" in FIG. 4) is sent into a cavity included between the outer surface of said green tyre 50 and the inner surface of said mold 102 (or said device 200). Substantially simultaneously, as shown in FIG. 4, by duct 110 (or 210) said primary working fluid under pressure (identified with "a" in FIG. 4) is sent into said toroidal support 10 to a lower pressure than that of said secondary working fluid. The transient has a duration included between 30 seconds and 1 minute; in a steady-state condition and for a duration of 30 seconds to 6 minutes, the pressure differential is lower than 10 bars, preferably of about 1-2 bars. Since the primary working fluid is of lower pressure, it will remain within said toroidal support 10 without escaping through the previously illustrated ducts. In this way during this step the green tyre 50 is pressed from the outside to the inside so that its inner surface preferably comprising the liner is pressed against the outer surface of the toroidal support 10.

Preferably said secondary working fluid is fed at room temperature, at a pressure generally included between 8 and 18 bars, while said primary working fluid, in this step preferably formed of steam, is fed to a pressure lower than 16 bars and a temperature generally included between approximately 170° C. and 210° C.

In the example shown in FIG. 4, the transient lasts about one minute, pressure of the secondary working fluid in a steady-state condition is about 16 bars and pressure of the primary working fluid is about 14 bars, the differential pressure therefore being about 2 bars.

As above illustrated, in a steady-state condition this step lasts some minutes (about two in the example shown in FIG. 4). During this period of time the primary working fluid heats the toroidal support 10 which transmits heat to the inner surface of the tyre, and consequently to the bead region and preferably the liner. If the airtight device is enclosed and integrated into said mold 102, during the above step the cheeks 130A and 130B are heated by said heating fluid supplied into said ducts 105. This heat is substantially transmitted to the external surface of the bead region. Moreover if the airtight device 200 is provided externally of the mold 102, the external surface of said bead region may be heated by said devices 250 powered by said resistors or said primary working fluid as hereinabove described. This heating does not fully cure said parts of the tyre but at all events it is sufficient to give the parts themselves features of elasticity. In particular, the carcass ply or plies are well anchored to the beads and the inner tyre surface, preferably the liner, becomes elastic enough to withstand the subsequent pressure of the molding and vulcanisation process illustrated in the following, without tearing.

Termination of this step involves evacuation of the secondary working fluid through the discharge duct 109 (or 209), preferably in a period of time shorter than 2 minutes (1 minute in the example shown).

If mold 102 is airtight, a subsequent step immediately starts for molding and fully curing said tyre (as shown in FIGS. 2, 4). Said step begins through raising of said primary-working fluid pressure to a value included between 18 and 35 bars, preferably 26-28 bars, for the purpose of molding and curing the tyre with the desired tensioning on the carcass ply.

In this step the primary working fluid preferably comprises a steam-nitrogen mixture, although it may consist of steam alone or steam admixed with air or other substantially inert gases, or one or more gases such as air, nitrogen and other substantially inert gases.

Pressure generated by said primary working fluid reaches a diffusion gap created between the outer surface of the toroidal support 10 and the inner surface of the tyre to be cured.

In a preferential embodiment, the diffusion gap is directly created following a tyre expansion caused by effect of the thrust exerted by said primary working fluid. In other words, pressing of the tyre against the walls of the molding cavity 104 takes place concurrently with an expansion imposed to the tyre itself, until bringing the outer surface thereof to fully adhere to the inner walls of the molding cavity 104. Then said pressing operation takes place simultaneously with administration of heat to produce cross-linking of the elastomer material forming the tyre itself and consequent geometric and structural definition of the latter. Advantageously, said primary working fluid determining the desired pressure allowing the tyre to be molded, also supplies heat necessary for vulcanisation.

It will be recognised that in the concerned method, during said expansion imposed to the tyre to complete the molding and curing operations, the inner surface of same (preferably the liner and part of the beads) is in an elastic state, as already said, i.e. these tyre parts are partly cured for the above stated reasons.

In this case the inner tyre surface behaves like a vulcanisation bladder in a conventional vulcanisation method, wherein an inflatable bladder acts against the inner surface of a green tyre, manufactured without the aid of a toroidal support, for molding it against the mold walls and distribute the elastomer material present in the different semifinished products in a substantially uniform manner.

Consequently, in the method of the invention, although in the absence of an inflatable bladder, the inner tyre surface (preferably the liner) that already has good elasticity features, transmits the primary-working fluid pressure to the whole tyre in a substantially uniform manner and behaves like the inflatable bladder of a traditional method. Therefore, thanks to a uniform molding, a vulcanised tyre substantially meeting the nominal design features is obtained.

Should said airtight device 200 be provided separated from said mold 102, at the end of the step of evacuating said secondary working fluid the tyre is extracted from said device in an automated or manual manner and is placed into a mold in which the molding and curing steps go on in a manner substantially identical with the above described one.

It is to be noted that during the tyre-pressing step from the outside to the inside in order to press the inner tyre surface against the outer surface of the toroidal support 10, heating of said inner tyre surface can be carried out by use of said primary working fluid under pressure conveyed through the toroidal support as previously illustrated, or by heating the toroidal support independently of use of said primary working fluid, by means of electric resistors, for example. In the last-mentioned case pressure of the secondary working fluid can also be of few bars (even 2 or 3), provided the differential pressure keeps within the above stated range.

It will be finally recognised that in the method of the invention said step of pressing the inner surface of the green tyre 50 against said outer surface of the toroidal support 10 can take place indifferently before, after or simultaneously with heating of said toroidal support.

The invention claimed is:

1. A method of molding and curing a tyre for a vehicle wheel, comprising:
   building an unvulcanized tyre on a toroidal support;
   heating the toroidal support;
   pressing an inner surface of the tyre against an outer surface of the toroidal support; and
   pressing an outer surface of the tyre against walls of a molding cavity defined in a vulcanization mold;
   wherein a shape of the outer surface of the toroidal support substantially matches that of the inner surface of the tyre,
   wherein the toroidal support is heated to transmit heat to the inner surface of the tyre in contact with the toroidal support,
   wherein the inner surface of the tyre is pressed against the outer surface of the toroidal support by at least one secondary working fluid under pressure while an at least one primary working fluid provides heat and pressure to the inner surface of the tyre such that the pressure of the at least one secondary working fluid is greater than the pressure of the at least one primary working fluid, wherein after the inner surface of the tyre has been pressed against the outer surface of the toroidal support by the at least one secondary working fluid under pressure, the outer surface of the tyre is pressed against the walls of the molding cavity by the at least one primary working fluid under pressure, which passes in at least one diffusion gap between the outer surface of the toroidal support and the inner surface of the tyre, and wherein the at least one primary working fluid is heated to supply heat to the tyre, causing vulcanization of the tyre.

2. The method of claim 1, wherein the toroidal support is heated using electric resistors.

3. The method of claim 1, wherein the toroidal support is heated using the at least one primary working fluid conveyed into the toroidal support.

4. The method of claim 1, wherein during pressing the inner surface of the tyre against the outer surface of the toroidal support, the pressure of the at least one primary working fluid is less than 16 bars.

5. The method of claim 1, wherein during pressing the inner surface of the tyre against the outer surface of the toroidal support, the pressure of the at least one secondary working fluid is between 8 bars and 18 bars.

6. The method of claim 1, wherein during pressing the outer surface of the tyre against the walls of the molding cavity, a pressure of the at least one primary working fluid is between 18 bars and 35 bars.

7. The method of claim 1, wherein a temperature of the at least one primary working fluid is greater than or equal to about 170° C. and less than or equal to about 210° C.

8. The method of claim 1, wherein the at least one primary working fluid comprises steam, nitrogen, or steam and nitrogen.

9. The method of claim 1, wherein pressing the inner surface of the tyre against the outer surface of the toroidal support comes before heating the toroidal support.

10. The method of claim 1, wherein pressing the inner surface of the tyre against the outer surface of the toroidal support comes after heating the toroidal support.

11. The method of claim 1, wherein pressing the inner surface of the tyre against the outer surface of the toroidal support takes place substantially simultaneously with heating the toroidal support.

12. The method of claim 1, further comprising:
transmitting heat to an external surface of a bead region of the tyre.

13. The method of claim 1, wherein the toroidal support and the unvulcanized tyre supported by the toroidal support are disposed in an airtight device and wherein the vulcanization mold is disposed outside of the airtight device and configured to operate outside the airtight device.

14. An apparatus for molding and curing a tyre for a vehicle wheel, the apparatus comprising:
a toroidal support having an inner surface and an outer surface;
an airtight vulcanization mold configured to receive the toroidal support, which is adapted to support an unvulcanized tyre within a molding cavity of the vulcanization mold;
a passage device, which fluidly connects the inner surface of the toroidal support and an outer surface of the toroidal support, and is configured to feed at least one primary working fluid under pressure between the outer surface of the toroidal support and an inner surface of the tyre;
a feeding device configured to engage the airtight vulcanization mold and to supply at least one secondary working fluid to an outside surface of the tyre when said mold is closed;
first heating devices configured to heat the toroidal support; and
second heating devices configured to heat the at least one primary working fluid to supply heat to the tyre, causing vulcanization of the tyre;
wherein the apparatus is adapted to feed simultaneously both the at least one primary working fluid under pressure and the at least one secondary working fluid under pressure such that the pressure of the at least one primary working fluid can be either greater than, less than, or equal to the pressure of the at least one secondary working fluid.

15. The apparatus of claim 14, wherein the feeding device comprises:
at least one delivery duct; and
one discharge duct.

16. The apparatus of claim 14, wherein the at least one primary working fluid is used to heat the toroidal support.

17. The apparatus of claim 14, wherein the first heating devices comprise electric resistors.

18. The apparatus of claim 14, wherein the vulcanization mold comprises:
a lower half;
an upper half;
at least one circumferential seal; and
a plurality of other seals;
wherein the lower half is engaged with a base,
wherein the upper half is engaged with a closing portion,
wherein the at least one circumferential seal is disposed on opposite surfaces of the lower and upper halves, and
wherein the plurality of other seals is disposed close to vents for releasing the at least one primary working fluid.

* * * * *